(No Model.) 3 Sheets—Sheet 2.

N. C. BASSETT.
ELECTRIC LOCOMOTIVE.

No. 455,298. Patented July 7, 1891.

WITNESSES
S. B. Thompson

INVENTOR
Norman C. Bassett
by Bentley Knight
Attys.

(No Model.)
N. C. BASSETT.
ELECTRIC LOCOMOTIVE.
No. 455,298. Patented July 7, 1891.
Fig-4-
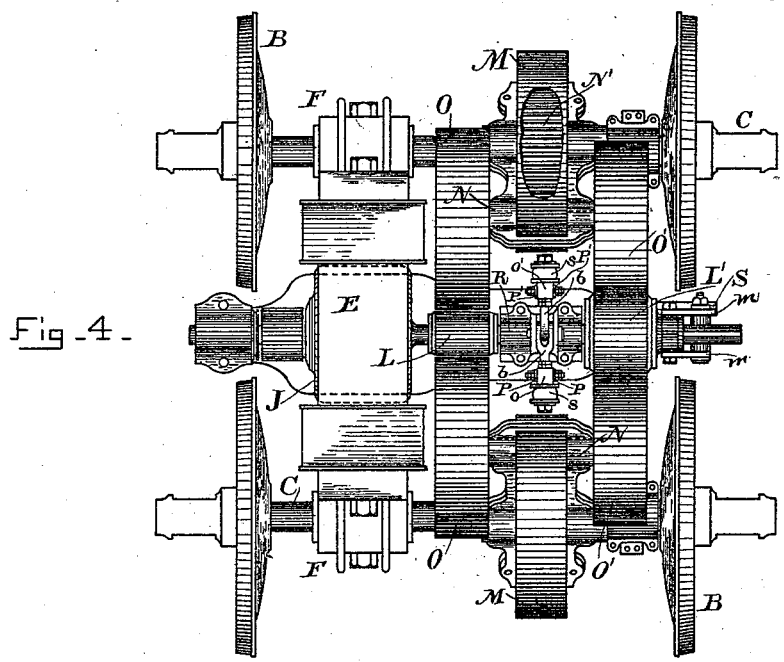
Fig-5-
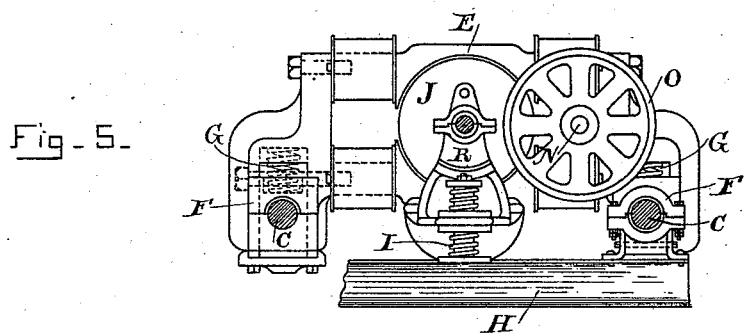
Fig-6-
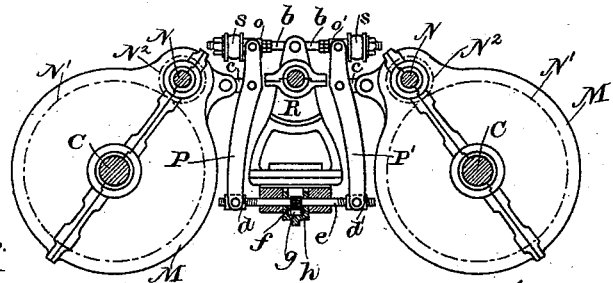

UNITED STATES PATENT OFFICE.

NORMAN C. BASSETT, OF LYNN, MASSACHUSETTS, ASSIGNOR TO THE THOMSON-HOUSTON ELECTRIC COMPANY, OF CONNECTICUT.

ELECTRIC LOCOMOTIVE.

SPECIFICATION forming part of Letters Patent No. 455,298, dated July 7, 1891.

Application filed October 30, 1890. Serial No. 369,800. (No model.)

*To all whom it may concern:*

Be it known that I, NORMAN C. BASSETT, a citizen of the United States, residing at Lynn, in the county of Essex and State of Massachusetts, have invented a certain new and useful Improvement in Electric Locomotives, of which the following is a specification.

My present invention has to do with an improved motor car or locomotive driven by an electric motor. In designing it I have had in view more particularly that class of motor-cars which are not intended to carry passengers themselves, but to propel one or more other cars, though my improvements are alike applicable to such a locomotive and to the passenger-cars in ordinary use.

My objects are to mount the motor directly upon the truck-axles, with its weight supported upon springs, and, secondly, to provide variable friction-gearing for transmitting the power to the axles, which shall be practically noiseless, and may be thrown into and out of action to vary the speed of the car while the motor is running.

With these objects in view I have devised the improvements hereinafter described, and their general nature may be briefly outlined by noting that the motor extends across from axle to axle of the truck and is mounted directly thereon by spring-bearings, while upon the armature-shaft of the motor there are variable friction-pinions, which engage corresponding friction-wheels fixed upon a counter-shaft, which is geared to and swings about the axle as a center. These improvements are all illustrated in the accompanying drawings, in which—

Figure 1:
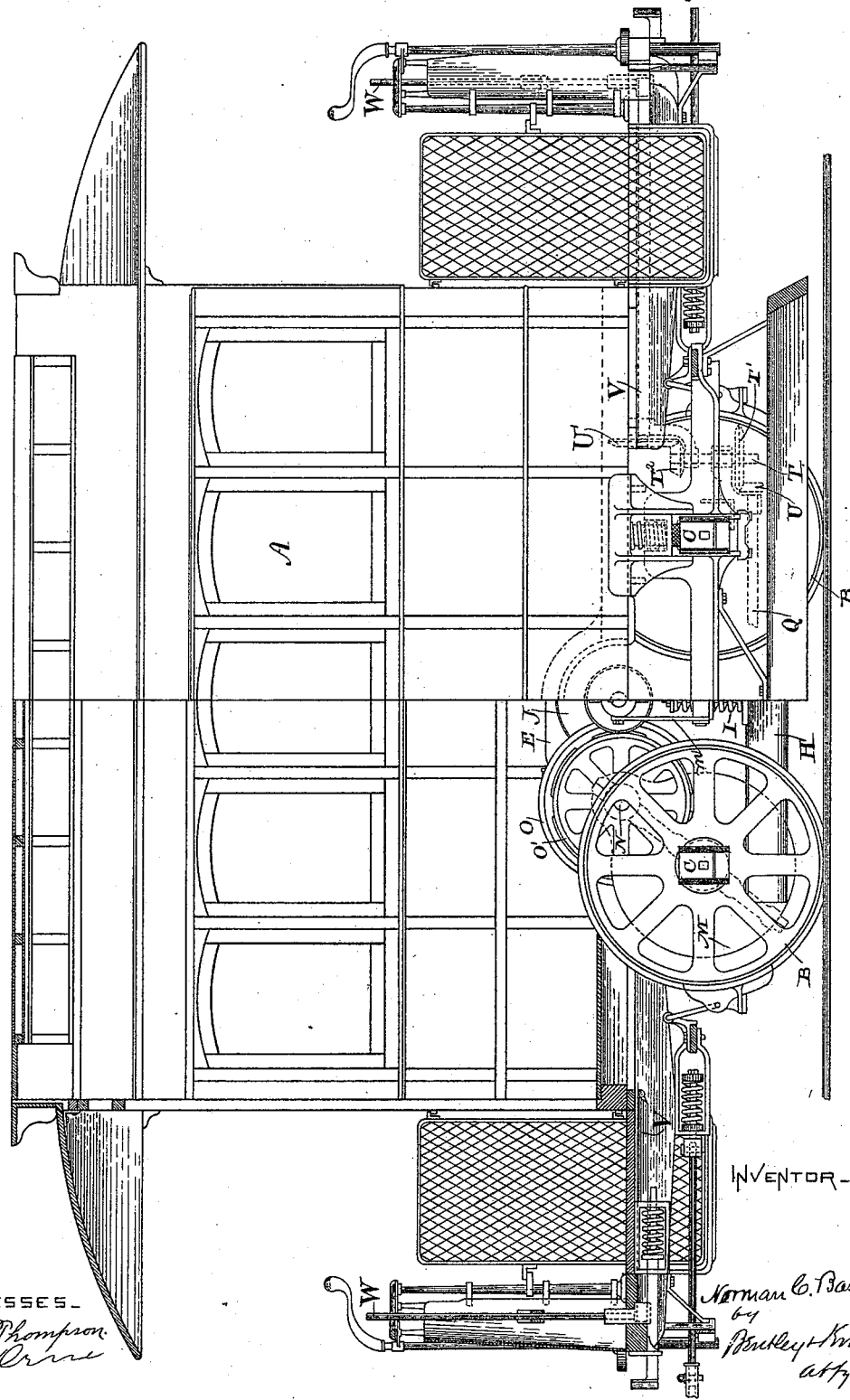
Figure 2:
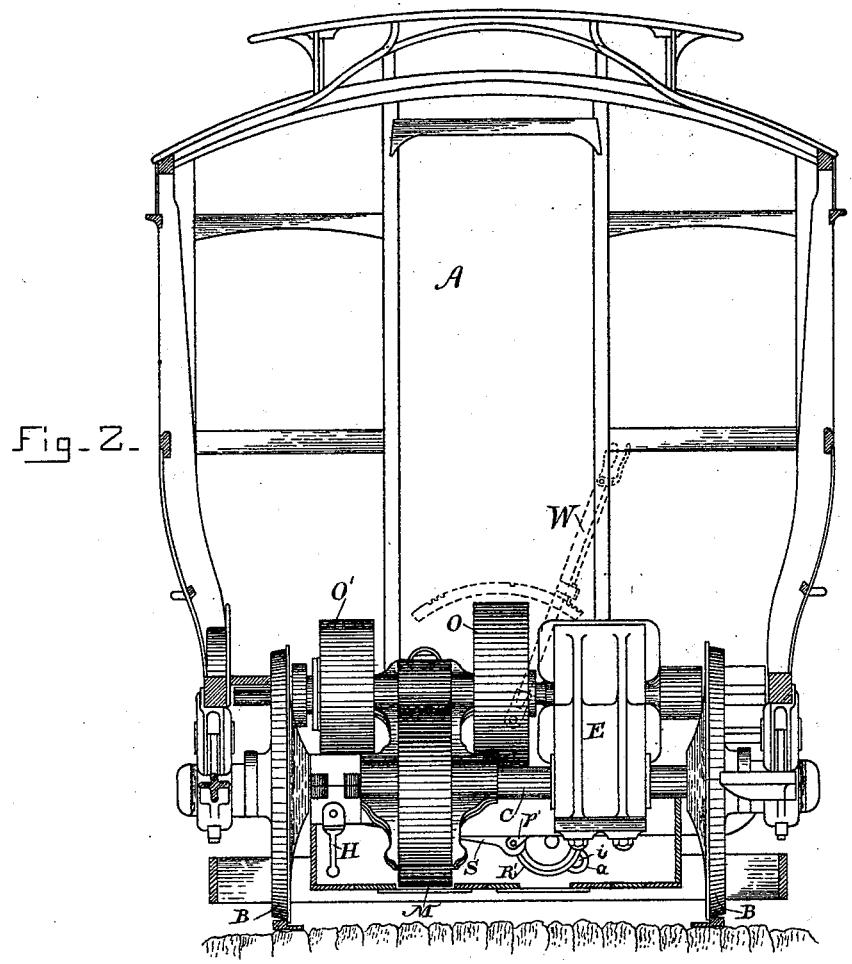
Figure 7:
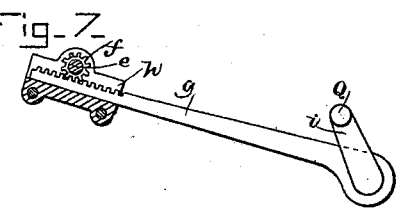
Figure 8:
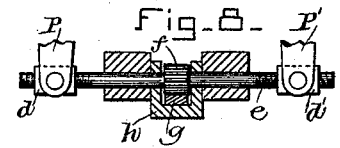
Figure 3:
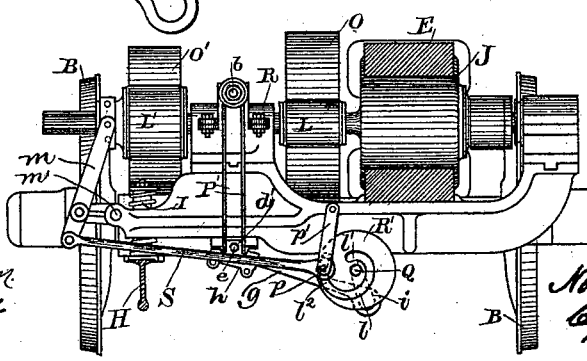

Figure 1 represents the locomotive half in side elevation and half in section. Fig. 2 is an end view of the same with the car-body removed so as to show the power-transmitting gearing clearly. Fig. 3 is a transverse sectional view taken near the center of the truck and showing particularly the means for controlling the friction-wheels and sliding pinion. Fig. 4 is a plan view of the truck. Fig. 5 is a side elevation of the motor, showing the axles in section and a portion of the truck-frame. Fig. 6 is a longitudinal section of the truck, taken at such a point as to show the gear-casings journaled on the axle and the operating mechanism therefor; and Figs. 7 and 8 are details of the rack and turning-shaft, seen also in Fig. 6.

In the views the axles of the truck are shown at C C and the wheels at B B, upon which is mounted in the usual manner the car-body A, provided with seats for passengers or not, according to the use it is designed to make of the truck. The electric motor E extends across from axle to axle, and is journaled directly thereon by boxes F F, in which are placed cushioning-springs G G for preventing pounding of the wheels upon the track. A deck beam or frame H is hung from the axles by suitable boxes and furnishes still a third spring-support for the motor, as at I, Fig. 5, at a point midway between the axles and in line with the armature-shaft.

The armature J is disposed transversely across the truck, and mounted upon it are the paper friction-pinions L L', of which the smaller L is fixed rigidly to the shaft, and the larger L' is keyed or splined thereto, so that while it is compelled to rotate with the shaft it can slide longitudinally thereon to a point out of line with the friction-wheels O' O', which in Fig. 4 are shown in engagement with it. Journaled to each axle by suitable boxes is a gear-casing M, furnishing bearings for a counter-shaft N and inclosing a wheel N' and pinion $N^2$, by which the counter-shafts are kept in gear with the axles. Upon the ends of each counter-shaft are mounted two friction-wheels O O', which vary in diameter an amount corresponding with the variations in size of the friction-pinions, and they are so arranged that O O are in line with each other, as are also O' O'. As seen in Fig. 4, one set of wheels is adapted to be driven by the pinion L and the other set by the second pinion L', thereby communicating the power of the motor to the car at different leverages. Upon downgrades both sets of gears may be thrown out of action, the armature stopped, and the car be allowed to run free, while by disconnecting the gears in the same manner, when it is desired to stop the car the heavy braking now necessary to arrest the momentum of the armature becomes no longer needful. On starting the car the smaller pinion L will first be thrown into gear to gain the greater leverage, and to start at a comparatively slow rate of speed; but later the friction-wheels will be shifted so as to bring the larger friction-pinion into action, and thereby greater speed will be attained.

The operating mechanism for thus controlling the gearing will now be described. Vibrating levers P P' are fulcrumed at their upper ends to the collars $o\ o'$ upon lugs or arms $b\ b$, projecting from either side of the box R, in which the armature-shaft turns, and cushioned by rubber blocks $s\ s$. They are connected with lugs cast upon the gear-casings by links $c\ c$, and their lower ends are pivoted to traveling nuts $d\ d'$ upon the turning rod or shaft $e$, which is provided with left and right hand screw-threads at its ends, respectively, so that the nuts are caused to move in and out simultaneously. At the center of this turning rod is a small gear-wheel $f$, and meshing with the wheel is a rack-bar $g$, which is held in place by a slide-box $h$, journaled upon the rod, as shown, and free to turn around it, so as to prevent binding. The inner end of the rack-bar is connected to a crank $i$ upon an operating-shaft Q, which extends lengthwise of the truck, as seen in Fig. 1. Upon rotating this shaft the traveling nuts will be moved back and forth, thereby throwing the levers, so as to swing the gear-casings and counter-shafts around the axles and bringing the wheels into and out of gear with the pinions on the armature-shaft.

In Fig. 4 the larger friction-pinion L' is shown in action, and before it will be possible to bring the wheels O O into engagement with the smaller pinion it is evident that L' must be moved out of line with the wheels O'. This is done by the same mechanism which moves the counter-shafts. Upon the shaft Q is fixed a cam R', having a groove, which is eccentric with the shaft for a portion of its length $l$ and concentric at either end, as at $l'\ l^2$. A lever $m$, pivoted at $m'$, is connected to the friction-wheel L' by a trunnion-ring, and pivoted to the lower end of the lever is a link S, which is provided with a roller $p$, entering the groove in the cam, and is sustained by the link $p'$.

The manner in which this mechanism operates will now be understood, it being premised that movement of the rack to the right brings the friction-wheels together and to the left forces them apart. The crank and cam are shown in Fig. 4 in the positions which they occupy when the wheels O' are in gear with the pinion L'. The roller $p$ is in the concentric portion $l^2$ of the groove, and the crank may therefore be thrown still farther to the right to force the wheels O' O' down harder upon the pinion L' without affecting the position of the pinion. If now it is desired to free the motor entirely from the gearing, the crank will be turned toward the left, carrying the rack with it, and the friction-wheels will be withdrawn from the armature-shaft, so that neither set is in gear. If the rotation of the crank in this direction be continued, the roller on meeting the eccentric portion $l$ of the groove will be drawn in toward the shaft, and thereby cause the pinion L' to slide out of line with the wheels O' O', and as the crank passes the roller the rack will be moved to the right and the wheels O O brought together upon the pinion L and forced down thereon while the roller is traversing concentric pinion $l'$ of the groove.

The operating-shaft may be rotated from the driver's stand at either end of the car by various forms of mechanism, one of which is seen in dotted lines in Fig. 1 and consists of a short vertical shaft T, having two beveled gear-wheels T' T² upon its ends, which mesh with corresponding wheels U U', one upon the operating-shaft Q and the other upon a rocker-shaft V, journaled in hangers from the car-body. One of these pinions T will be keyed to its shaft, so as to allow it to slide up and down thereon to compensate for the vertical motion of the car-body relatively to the axles upon the springs. The lever W is connected with the rocker-shaft V, and by this single lever the friction-gear may be controlled in any manner desired. For example, in Figs. 1 and 2 the lever is shown in the position which it occupies when the friction-wheel L' is in action. If now it be thrown to its central position, both sets of friction-wheels are withdrawn from the armature, and this runs free at its maximum speed. If the lever be still farther thrown to the left, the pinion L' will be moved out of line with the wheels O' and the counter-shafts will be swung toward one another, so as to bring the smaller friction-pinion into engagement with the wheels which it drives. By the use of this gearing a considerable saving in the current required at starting is effected, because of the great leverage gained by the small pinion and the momentum of the armature itself, which acts as a fly-wheel to help overcome the inertia of the car. There is therefore a correspondingly smaller draft made on the power-station, and a larger number of cars can be run per generator, increasing the efficiency and reducing the total number of generators required. The friction-pinions will have a slight vertical motion as the motor plays up and down in its spring-bearings; but this will not be sufficient to destroy their contact with the friction-wheels, because the pinions are on a level with the centers of the wheels, where for a short space the distance between the wheels is nearly uniform.

What I claim as new, and desire to secure by Letters Patent, is—

1. The combination, with the wheels and axles of an electric-motor car, of the electric motor having a spring-support upon each axle and an auxiliary spring-support at a point between the axles, as set forth.

2. The combination, in an electric-motor car, of a motor having a spring-support upon each of the two axles of the truck, with a frame joining the axles and furnishing an auxiliary means for supporting the motor.

3. The combination, in an electric-motor car, of the electric motor extending from axle to axle of the truck and having a spring-support upon each of the said axles, with a frame rigid with the axles, and a third spring-support for the motor thereon substantially in line with the armature, as set forth.

4. The combination, in an electric-motor car, of an electric motor and friction-pinion driven thereby, with a friction-wheel communicating the movement of the pinion to the truck-axle pivoted so as to swing about the said axle as a center into and out of engagement with the pinion, as described.

5. The combination, in an electric-motor car, of an electric motor and friction-pinion on the armature-shaft with a counter-shaft geared to the truck-axle and movable about the same as a center, and a friction-wheel upon the counter-shaft, which may thereby be brought into and out of engagement with the pinion, as described.

6. In an electric-motor car, the combination of an electric motor and variable friction-pinions driven thereby, with a counter-shaft whose bearings are adjustable toward and away from the pinions, corresponding friction-wheels on the counter-shaft for transmitting the power of the motor to the axle, and means for adjusting said shaft so as to bring either set of gears into action, as described.

7. In an electric-motor car, the combination of an electric motor having a friction-pinion upon its armature-shaft, and a second friction-pinion of greater diameter splined or keyed to said shaft, but free to slide thereon, with the counter-shaft free to turn about the driving-axle as a center and carrying variable friction-wheels for engaging the said pinions, as described.

8. The combination, in an electric-motor car, of an electric motor having a friction-pinion upon its armature-shaft, with separate friction-wheels in gear with the different truck-axles, respectively, and each pivoted so as to swing around a center into and out of engagement with the said pinion.

9. The combination, in an electric-motor car, of an electric motor, variable friction-pinions upon the armature-shaft, one of which is free to slide longitudinally thereon, and the variable friction-wheels mounted upon a counter-shaft and movable into and out of engagement with the pinions, with a lever or equivalent operating device on the car, and intermediate mechanical connections such that the lever furnishes means for moving both the friction-wheels and sliding pinion, as set forth.

10. The combination, in an electric-motor car, of an electric motor having variable friction-pinions upon its armature-shaft, with the counter-shafts and friction-wheels movable about a center into and out of gear with the pinions, the pivoted levers connected with the counter-shafts, respectively, and means for operating the said levers from the driver's stand on the car.

11. The combination, in an electric-motor car, of an an electric motor and friction-pinions driven by the armature-shaft with the counter-shafts movable about a center and provided with friction-gear for communicating the power of the motor to the axles, the levers connected with the said shafts, the turning rod, and the traveling nuts for moving the counter-shafts, as set forth.

12. The combination, in an electric-motor car, of an electric motor and the variable-speed friction-gear, comprising the friction-wheels movable about a center, and friction-pinions, one of which is free to slide on the armature-shaft, with an operating-shaft connected mechanically with the said wheels, a cam on the shaft, and a link between the cam and sliding pinion, whereby upon rotating the said shaft the pinion and wheels may both be moved, as described.

13. The combination, in an electric-motor car, of an electric motor with a gear-casing pivoted upon the truck-axle, a counter-shaft journaled in bearings on the said casing and in gear with the axle, and friction-gearing between said counter-shaft and armature of the motor, whereby the armature can be thrown into and out of gear with the axle, as described.

14. The combination, in an electric-motor car, of an electric motor having its armature-shaft arranged transversely of the truck between the axles and having variable friction-pinions thereon, with a counter shaft provided with corresponding variable friction-wheels and connected with the axle by a single set of gears, and means for moving either set of friction-gears into action at will to transmit the power of the motor to the axles.

In testimony whereof I have hereunto set my hand this 27th day of October, 1890.

NORMAN C. BASSETT.

Witnesses:
JOHN W. GIBBONEY,
CHARLES E. MANN.